United States Patent [19]

Huang

[11] Patent Number: 4,501,142
[45] Date of Patent: Feb. 26, 1985

[54] TIRE PRESSURE GAUGE

[76] Inventor: Tien T. Huang, No. 4, 30 La., Wu-Chuang St., Pan-Chiao City, Taipei, Taiwan

[21] Appl. No.: 480,123

[22] Filed: Mar. 29, 1983

[51] Int. Cl.³ .................. B60C 23/02; G01L 7/08
[52] U.S. Cl. .................. 73/146.8; 73/714; 73/715
[58] Field of Search .............. 73/146.8, 709, 715, 73/744, 714; 368/10

[56] References Cited

U.S. PATENT DOCUMENTS 1,422,278  7/1922  Low .......................... 73/709
3,696,668  10/1972  Patrick ....................... 73/709
4,215,531  8/1980  Wong .......................... 368/10

Primary Examiner—Donald O. Woodiel
Attorney, Agent, or Firm—Banner, Birch, McKie & Beckett

[57] ABSTRACT

A tire pressure gauge has a tube member with first and second open ends, in which a diaphragm member is provided crosswise and suspended by a spring to sense the pressure of a tire. An indicator rod is movably provided lengthwise to be actuated by the diaphragm to extend outwardly through the second open end for visible indication. A writing and a time-indicating devices are incorporated with the gauge to act multi-functions of the gauge.

2 Claims, 4 Drawing Figures

TIRE PRESSURE GAUGE

BACKGROUND OF THE INVENTION

The present invention relates to a tire pressure gauge, and more particularly to a pressure gauge having writing and time devices incorporated therewith.

It is known that portable pressure gauges are provided for measuring pressure of tire. Usually such gauge includes a pressure sensing means for actuating an indicator which shows the pressure.

To diversify the function of such pressure gauges, it is intended in this invention to make further improvements to these devices.

SUMMARY OF THE INVENTION

According to the present invention, a tire pressure gauge, having a tube member with first and second ends in which a diaphragm is provided crosswise and is suspended by a spring to sense the pressure of a tire and in which an indicator rod is movably provided lengthwise to be actuated by the diaphragm to extend outwardly through the second end for visible indication, includes a writing means incorporated with the indicator rod.

The indicator rod has two diametric opposite resilient projections in rolling contact with the inner tube wall so that the indicator rod will move in the tube in a smooth manner.

According to an aspect of the present invention, a cap with a pocket clip is provided for covering either end of the tube. A time device is provided in the cap. With a writing device and a time device, the pressure gauge may have multiple uses.

It is therefore an object of the present invention to provide a multi-purposes tire pressure gauge.

It is another object of the present invention to provide a tire pressure gauge of better utility that can show time and can be used for writing.

These and other advantages of the present invention may best be understood with reference to the drawings, in which:

DETAILED DESCRIPTION OF THE PREFERRED EMBODIMENT

Figures 1, 2, 4:
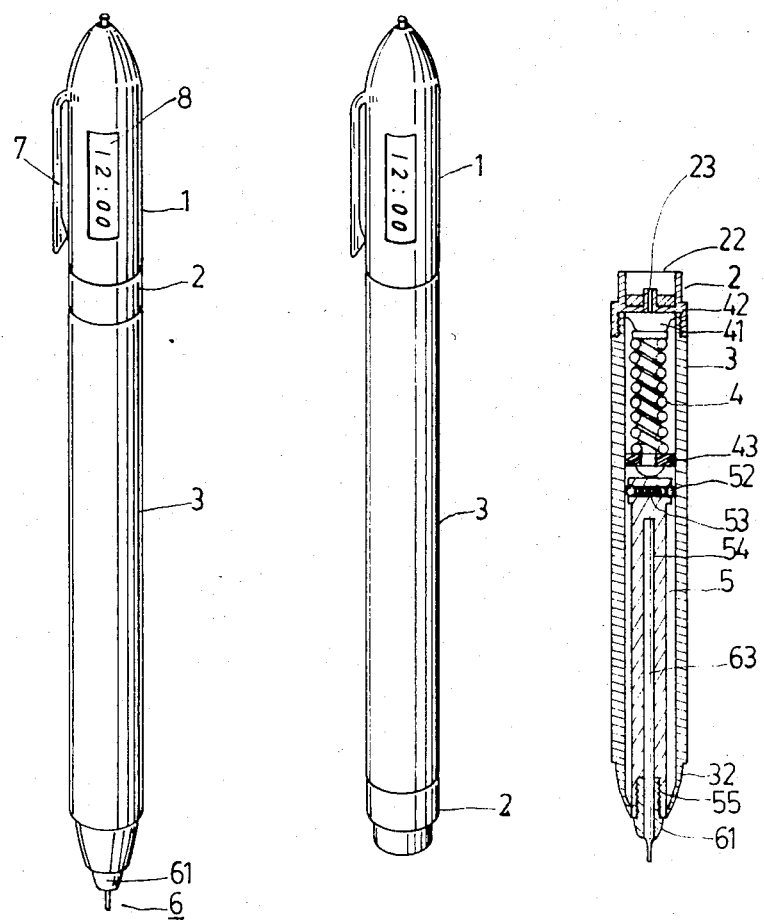
FIG. 1 is a perspective view of a tire pressure gauge of this invention with a cap provided at one end.
FIG. 2 is a perspective view of a tire pressure gauge with a cap provided at another end.
FIG. 4 is a sectional view of the tire pressure gauge.
Figure 3:
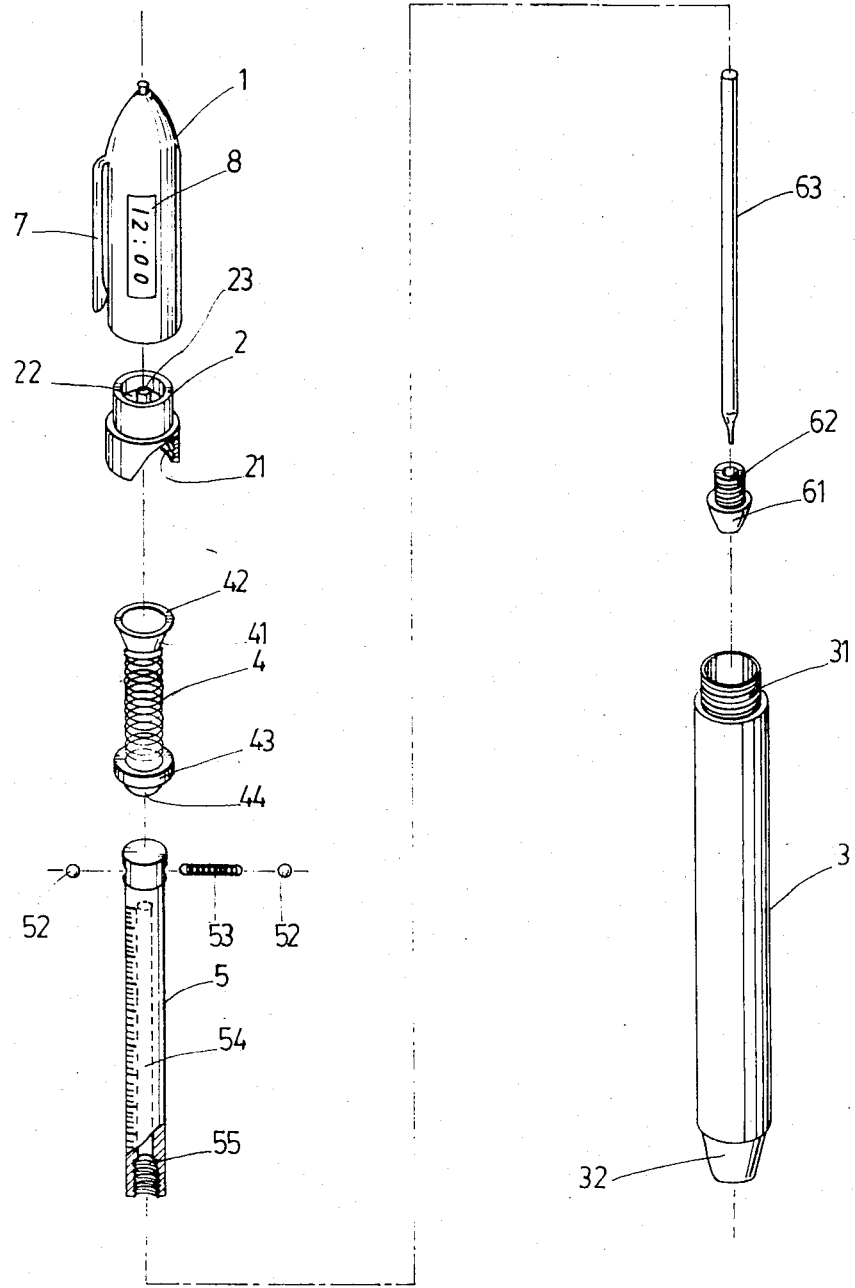
FIG. 3 is an exploded view of the tire pressure gauge.

Referring now to FIGS. 1 to 4, there is shown a tire pressure gauge which includes a pen-shaped tube 3, a pressure measuring head 2, a writing means 6 and a cap 1 with a pocket clip 7. The cap 1 can be provided either at the head 2 and at the end 32 of the tube 3 as required by the user. A time device which includes a display 8 is incorporated into the cap 1. This time device can be a known electronic device and can be provided in the cap 1 by any known manner as usually done in time pens.

The head 2 has an end 22 adaptable to be fitted in a blow valve of a tire so as to be in gas tight communicating relationship therewith, and has an air passage 23 and a female thread 21 to engage with a male thread 31 at the upper end of the tube 3. Within the tube 3, there are provided a tension spring 4, a pressure-indicator rod 5, an ink holder 6, and the tube 3 is gradually converged to the end 32.

The tension spring 4 is affixed to a flared hollow support 41 which has a flange 42 seated at the top end face of the threaded portion 31 of the tube 3. At the other end of the tension spring 4 is a diaphragm 43 which may be made of a rubber material and secured by a screw 44 to the free end of the tension spring 4. This diaphragm 43 is in sliding contact with the inner wall of the tube 3. An indicator rod 5 of cylindrical shape is placed beneath the free end of the tension spring 4 and with the upper end thereof contacting with the screw 44 and is actuated by the diaphragm 43 to extend outwardly through the end 32 of the tube 3 upon the spring 4 being stretched by the air pressure of a tire. With the reading provided on the outer surface of the indicator rod 5, the pressure of a tire can be known from the indicator rod 5. Two balls 52 and a spring 53 are mounted in a through hole 51 at the upper protion of the indicator rod 5. The spring 53 resides in the middle and urges the two balls 52 to contact with the inner wall of the tube 3. These spring 53 and balls 52 form two diametric opposite resilient projections which are in rolling contact with the inner wall of the tube 3, thus enabling the rod to move in a smooth manner. An axial bore 54 is provided within the indicator rod 5 to receive an ink holder 63 for writing. A female thread 55 is provided at the lower portion of the indicator rod 5 for engaging with a male thread 62 of an ink holder fastener 61.

Upon attaching the end 22 of the tube 3 to the blow valve of a tire, the air of the tire rushes into the tube 3 through the passage 23. As the diaphragm 43 is in sealing relationship with the inner wall of the tube 3, the air pressure pushes the diaphragm 43 which in turn actuates the indicator rod 5 to extend outwardly through the end 32 of the tube 3. The movement of the rod 5 terminates when the diaphragm 43 is in the state of equilibrium. The reading of the indicator rod 5 exposed will give the pressure of the tire.

While the present invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to emcompass all such modifications and equivalent structures.

What I claim is:

1. A tire pressure gauge of the type having a tube member with first and second ends in which a diaphragm member is provided crosswise and is suspended by a spring to sense the pressure of a tire to which said first end is attached, and in which an indicator rod is movably provided lengthwise to be actuated by said diaphragm to extend outwardly through said second end of said tube member for visible indication, wherein the improvement is made such that said indicator rod is provided with an axial bore open through one of its ends and closed at another end thereof, and that a writing means having an ink holder is received in said axial bore and is mounted in a fixed relationship with said indicator rod.

2. A tire presure gauge as claimed in claim 1, further including means for covering said first and second ends of said tube member, and means for indicating time incorporated in said covering means at one of said first and second ends.

* * * * *